United States Patent [19]
Waisnix

[11] Patent Number: 5,104,696
[45] Date of Patent: Apr. 14, 1992

[54] PROCESS AND DEVICE FOR INTERMITTENLY SPRAYING A PASTY COMPOSITION

[75] Inventor: Franz Waisnix, Vienna, Austria

[73] Assignee: Veitscher Magnesitwerkeactien-Gesellschaft, Vienna, Austria

[21] Appl. No.: 490,571

[22] PCT Filed: Aug. 25, 1989

[86] PCT No.: PCT/AT89/00074
§ 371 Date: Apr. 19, 1990
§ 102(e) Date: Apr. 19, 1990

[87] PCT Pub. No.: WO90/02610
PCT Pub. Date: Mar. 22, 1990

[30] Foreign Application Priority Data
Sep. 7, 1988 [AT] Austria .................. 2198/88

[51] Int. Cl.$^5$ .................. B05B 7/16; B05D 1/02; B05D 1/34; B05C 11/00
[52] U.S. Cl. .................. 427/345; 427/426; 427/427; 118/302; 118/304; 118/707; 118/708; 118/681; 264/30
[58] Field of Search .............. 118/707, 708, 304, 302, 118/681; 239/125, 579; 427/427, 345, 426; 264/30

[56] References Cited

U.S. PATENT DOCUMENTS

| | | | |
|---|---|---|---|
| 3,141,793 | 7/1964 | Oliphant | 118/300 |
| 3,413,385 | 11/1968 | Komac et al. | 264/30 |
| 3,644,138 | 2/1972 | Stiefken | 427/427 |
| 4,127,626 | 11/1978 | Kubo | 264/30 |
| 4,708,745 | 11/1987 | Schonhausen | 427/427 |

FOREIGN PATENT DOCUMENTS

| | | |
|---|---|---|
| 1274544 | 9/1960 | France . |
| 2048328 | 12/1969 | France . |
| 78191 | 6/1955 | World Int. Prop. O. . |

Primary Examiner—Shrive Beck
Assistant Examiner—Margaret Burke
Attorney, Agent, or Firm—Collard, Roe & Galgano

[57] ABSTRACT

In a process for intermittently spraying a setting pasty composition mixed with a tempering liquid, in particular for building up refractory linings of metallurgical vessels, the composition is conveyed from a preparing station (6) at which it is prepared, to a delivery nozzle (11). In order to prevent the composition from thickening or hardening in the duct (15) leading to the delivery nozzle (11) when delivery is interrupted, it is conveyed during delivery stops in a circuit that includes the delivery nozzle (11).

5 Claims, 3 Drawing Sheets

PROCESS AND DEVICE FOR INTERMITTENLY SPRAYING A PASTY COMPOSITION

The invention relates to a process for intermittently spraying a setting pasty composition mixed with a tempering liquid, in particular for building up refractory linings of metallurgical vessels, the composition being conveyed from a preparing station at which it is prepared, to a delivery nozzle. Furthermore, the invention relates to a device for carrying out the process.

In a process of the above kind which is used e.g. in the field of building construction for the application of roughcast or when repairing refractory linings, there is always the problem that whenever delivery of the composition is interrupted, it must at least be removed from the conveyor, any reservoir arranged therebefore, the ducts and the delivery nozzle, and said parts must be cleaned by rinsing with water in order to prevent the composition from hardening or thickening, as otherwise the hardened or thickened composition would block the delivery nozzle when spraying is started again. Furthermore, when restarting spraying of the composition there is the problem that more tempering liquid than is actually desirable for processing must mostly be added when remixing the composition. As a result of the above, a strongly diluted slurry of the composition ensues which is not usable and has to be disposed of at some expense and, additionally, there are considerable losses of material.

These problems arise especially when repairing refractory linings of metallurgical vessels, e.g. distributing chutes in continuous casting installations, by applying a refractory composition. As said refractory linings are subject to continuous wear, they must be repaired frequently within short periods. Between these successive spraying repairs, there are interruptions for up to about 3 to 5 hours. Because of the frequent turning off and starting up of the spraying apparatus, the amount of thinly diluted slurry which has to be disposed of and the losses of refractory material are extremely high.

It is the object of the invention to arrange a process of the aforementioned kind in such a manner that the prepared pasty composition remains usable during spraying interruptions which may last for several hours.

This object is achieved according to the invention in that the composition is conveyed during the interruptions in a circuit that includes the delivery nozzle.

This measure prevents the composition from hardening or thickening in the ducts or the delivery nozzle and it ensures furthermore that the spraying of the composition may be taken up at any time, the composition having an applicable consistence. The loss of material is thus considerably reduced, especially when for repairs on the refractory lining of metallurgical vessels the spraying of material has to be interrupted frequently.

According to a further feature of the invention, the circular conveyance of the composition during the interruptions may take place intermittently, preferably the amount of tempering liquid in the pasty composition being slightly increased.

This is especially recommended for compositions with a longer setting period in order to minimize wear of the apparatuses which prepare and deliver the composition. When adding some tempering liquid there is the advantage that a lower pressure may be used and the consistence of the composition still remains usable.

A further object of the invention refers to a device for carrying out the process according to the invention.

With regard to a device comprising a mixer for mixing the dry composition with a tempering liquid and comprising a conveyor placed after the mixer in the conveying direction of the composition and serving to lead the prepared composition to the delivery nozzle, it is hereby proposed that in the conveying direction of the composition an opening is arranged in the conveying path, said opening being located before the inlet of the conveyor, and the delivery nozzle being insertable into said opening.

This measure enables the process according to the invention to be carried out in a simple manner and ensures that the composition is conveyed during delivery stops in a circuit, while the preparation of additional composition is interrupted. It has also appeared that wear, especially of the pump, has been considerably reduced by the essential reduction in the number of cleanings of the device due to the circular pumping of the composition during interruptions lasting up to about 3 to 5 hours. In case of such interruptions the device hitherto had to be cleaned.

A preferred embodiment of the invention may comprise a probe which is sensitive to the inserted position of the delivery nozzle and which has an effect on the drive of the conveyor with regard to an at least temporary activation of the drive of the conveyor.

Thus it is possible to reduce the energy consumption and to further minimize wear of the device.

It may further be provided that said probe activates or deactivates a timer control of the drive of the conveyor with preferably adjustable stopping and working periods. Thus unnecessary wear of the conveyor is avoided.

Concerning a device comprising a delivery nozzle arranged on a lance, there is a very simple solution from a constructional point of view if said probe comprises a contact switch arranged on a support which is intended for receiving the lance in the area of the inlet of the conveyor.

The invention is further explained in detail with reference to the schematic drawings, wherein FIG. 1 shows an example of the device for carrying out the process according to the invention in a side view;

Figure 1:
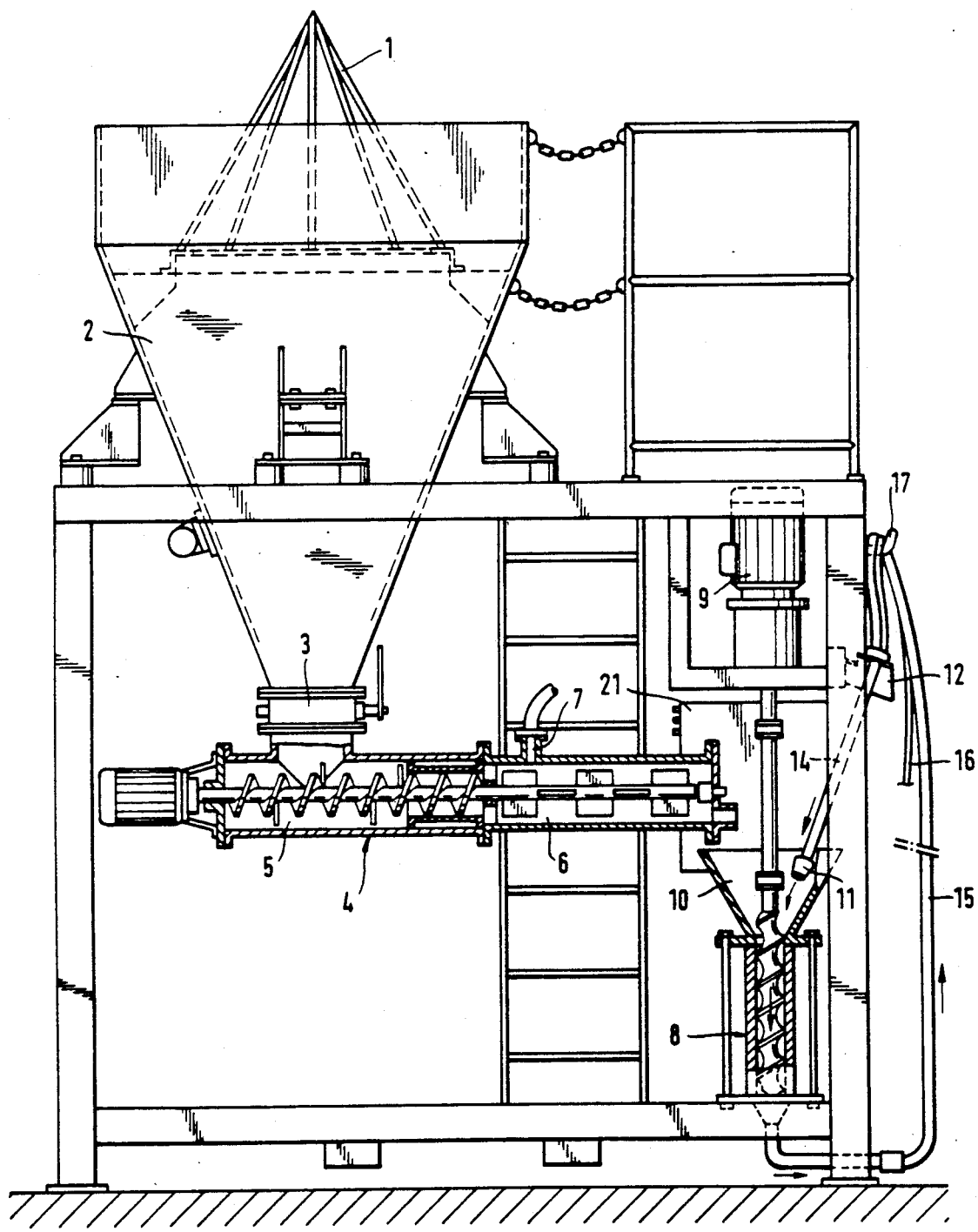
Figure 2:
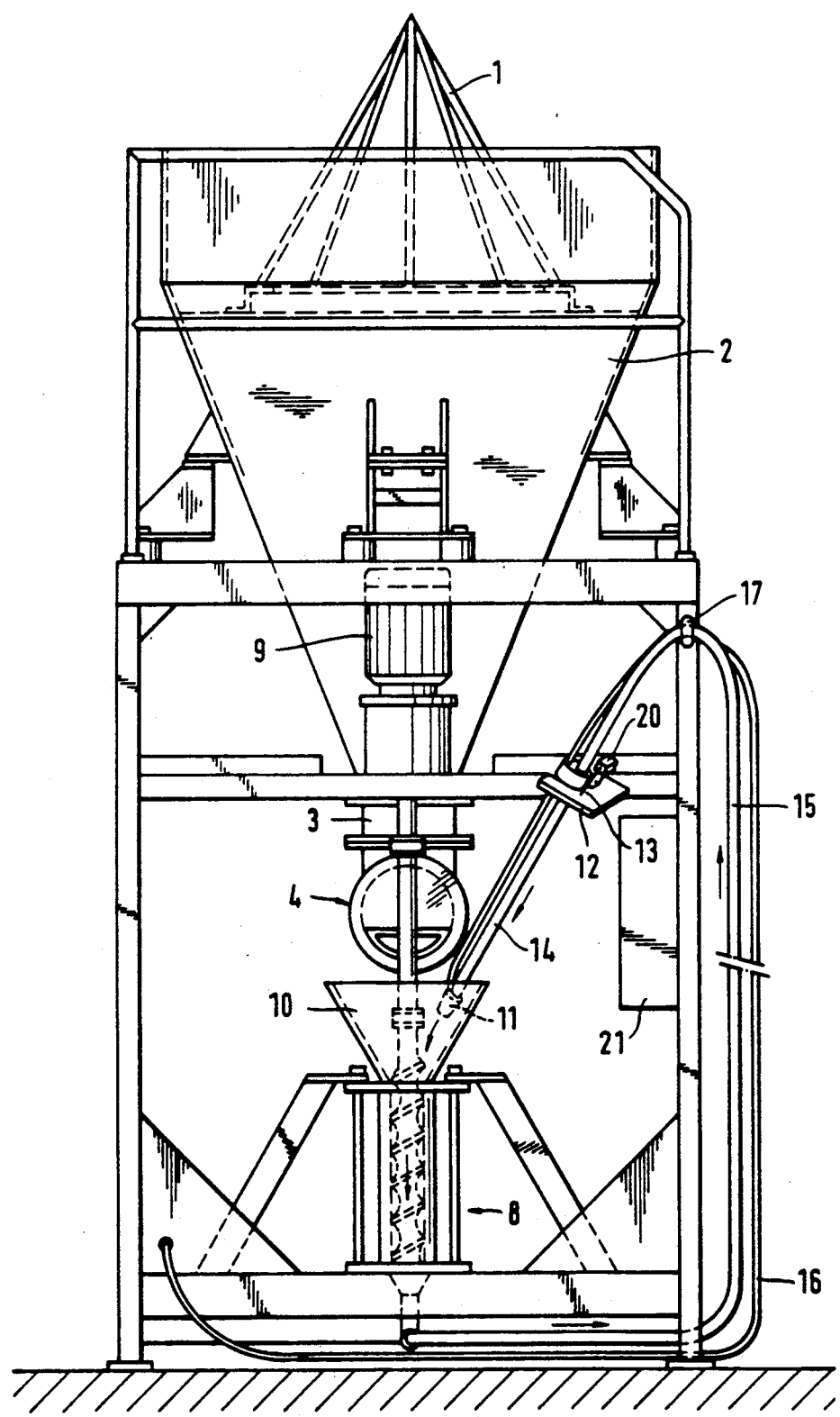
FIG. 2 shows a frontal view of the device according to FIG. 1.

The device according to FIG. 1 and 2 is basically equivalent to a common mixing plant.

Said device comprises a hopper 2 with a ripper spike 1 for the bags wherein the material is supplied, said hopper 2 being mainly conical and comprising at its lower end a lock flap 3.

Below the hopper there is a horizontal mixer 4, shown in a sectional view in FIG. 1. Mixer 4 can be emptied if flap 3 is in the closed position. Horizontal mixer 4 consists of a metering section 5 serving to apportion the composition, and a mixing section 6 following section 5. In the mixing section 6 a tempering liquid, usually water, is added via nozzle 7.

At the end of horizontal mixer 4, the composition thoroughly mixed with the tempering liquid drops into a material container 10 which is penetrated by the vertically arranged shaft of a motor 9. This shaft of motor 9 drives a conveyor 8 which may for instance be a spiral pump or an eccentric pump, as shown in FIG. 1 and 2 in a cross-sectional view. It conveys the prepared composition via a pressure hose 15 to a delivery nozzle 11. This delivery nozzle 11 is arranged at the end section of a spray lance 14 and may be supplied, via hose 16, with compressed air which serves to spray the composition leaving delivery nozzle 11.

A control box 21 is provided for controlling the device either manually or automatically, said control box controlling the drive of horizontal mixer 4 and conveyor 8 as well as the addition of tempering liquid via nozzle 7.

In accordance with the invention, the device comprises a lance support 12 into which spray lance 14 is placed when not in use, while delivery nozzle 11 reaches into material container 10. In the vicinity of lance support 12 a probe 13 is arranged, said probe being responsive to whether spray lance 14 is placed into lance support 12 or not.

Figure 3:
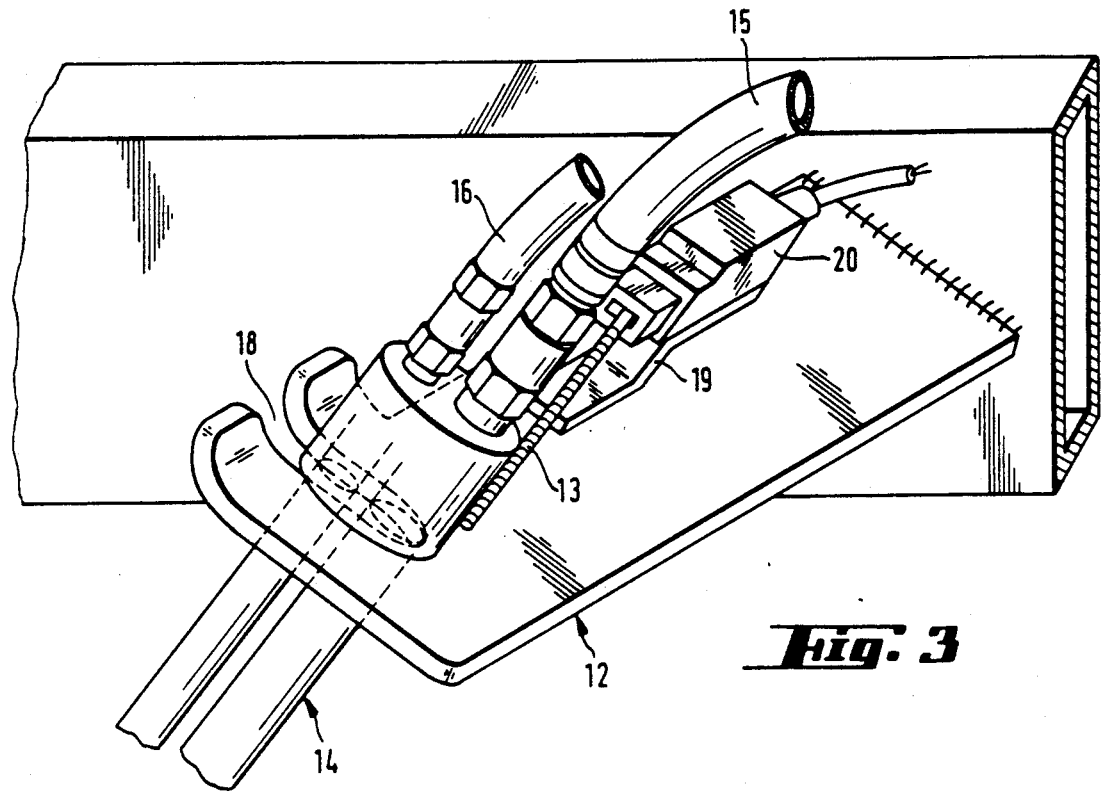
FIGS. 3 and 4 show details of the mounting of the lance in the device according to FIGS. 1 and 2.
Figure 4:
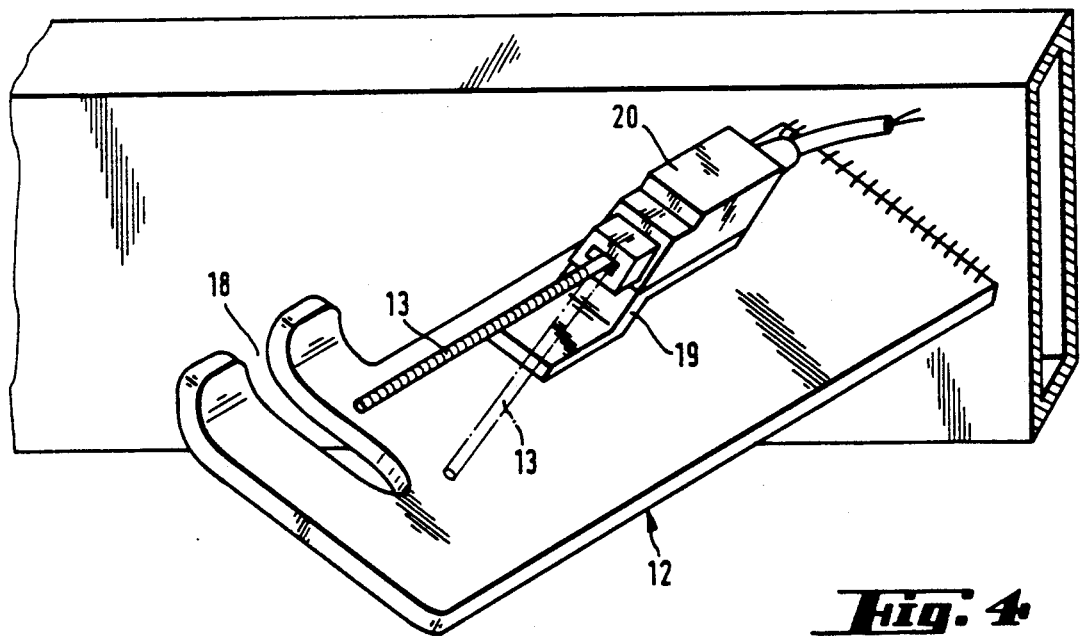

As can be seen from FIGS. 3 and 4, lance support 12 is attached to the machine frame and said support comprises a fork shaped receptacle 18 into which spray lance 14 may be placed. Probe 13 being movable against the force of a spring acts like a contact arm on contact switch 20, said switch being attached to lance support 12 by means of a mounting strap 19. Whenever lance 14 is placed into lance support 12 probe 13 is dislocated from its resting position and contact switch 20 accordingly brings about the respective contact.

When spraying the prepared composition, both horizontal mixer 4 as well as conveyor 8 are usually in operation. In order to prevent material container 10 from flowing over it is possible to shut off horizontal mixer 4 via control box 21 for a certain period whenever a certain level of material is reached in container 10. The stop period of horizontal mixer 4 until its reactivation may be adjusted according to the conveying performance of conveyor 8.

Whenever the spraying of the prepared composition is interrupted, spray lance 14 is placed into lance support 12 and hoses 15, 16 are placed over a strap 17, said strap being attached to the machine frame, while delivery nozzle 11 of spray lance 14 reaches into material container 10. At the same time probe 13 is displaced and a contact signal is relayed to control box 21 via contact switch 20, said contact signal causing horizontal mixer 4 to be stopped and the input of tempering liquid via nozzle 7 to be interrupted.

The composition contained in hose 15 or material container 10 is conveyed in a circuit by means of conveyor 8 through hose 15, spray lance 14, delivery nozzle 11, and container 10. By means of this circular pumping the composition is moved continuously and thus a thickening or hardening of the composition is prevented. The composition remains usable even if spraying is interrupted for several hours.

In many cases it is sufficient if the circular pumping only takes place occasionally in short intervals, especially if said composition is refractory. For this purpose an interval control may be provided for motor 9 of conveyor 8, said interval control enabling a preadjustment of the working and stopping periods of motor 9 of conveyor 8.

The most suitable working and stopping periods depend on the ingredients of the composition and the length and diameter of hose 15. If e.g. said hose has a length of 20 m and a diameter of 25 mm, the interval operation of conveyor 8 could amount to 1 min working period and 15 to 20 min rest period in order to prevent thickening or hardening of the composition in the hose and to keep the composition in a permanently usable condition. If necessary, slight amounts of tempering liquid may be added.

When spray lance 14 is taken away from lance support 12, probe 13 returns to its resting position by force of a spring and contact switch 20 interrupts the circuit for the circular pumping. Thus horizontal mixer 4 is operational again. If automatic control was chosen, horizontal mixer 4 and the input of tempering liquid via nozzle 7, said nozzle being switched in parallel to horizontal mixer 4, are turned on. At the same time motor 9 of conveyor 8 takes up permanent operation.

If the spraying device is to be placed out of operation for a longer period, flap 3 is closed, horizontal mixer 4 is emptied, and the composition contained in container 10 is delivered by means of conveyor 8 via hose 15, spray lance 14, and nozzle 11. As usual, more water must be added when material container 10 is nearly empty in order to ensure that container 10 and hose 15 are cleaned. This composition, however, is no longer usable and must be disposed of accordingly.

I claim:

1. A process for intermittently spraying a setting pasty composition in successive spraying cycles, which comprises the steps of mixing a particulate solid material with a tempering liquid to prepare the pasty composition at a preparation stage, conveying the pasty composition to a delivery stage including a spray nozzle during each spraying cycle, interrupted the conveyance of the pasty composition to the delivery stage between the successive spraying cycles, and conveying the pasty composition at the delivery stage in a closed circuit including the spray nozzle while the conveyance of the pasty composition to the delivery stage is interrupted; and said delivery stage including a conveyor arranged to convey the pasty composition in a conveying direction downstream from an inlet of the conveyor receiving the pasty composition from a mixer, said spray nozzle downstream of the conveyor inlet, the conveyor conveying the pasty composition in a conveying path from the inlet to the spray nozzle, and a support arranged in the conveying path upstream of the inlet and defining an opening for receiving the spray nozzle whereby the nozzle may be inserted in the opening for positioning in the inlet and the conveying path forms a closed circuit;

further comprising a drive for the conveyor, and a probe sensing the inserted position of the spray nozzle in the support opening and controlling the conveyor drive;

whereby whenever said spray nozzle is inserted into said support opening, said probe is displaced generating a contact signal, which causes said mixer to stop and said tempering liquid to be interrupted; and whenever said spray nozzle is removed from said support opening, said probe returns to a resting position canceling the contact signal, which causes the mixer to operate again and said tempering liquid to be turned on.

2. An apparatus for intermittently spraying a setting pasty composition in successive spraying cycles, which comprises a preparation stage including a mixer for mixing a particulate solid material and a tempering liquid to prepare the pasty composition, and a delivery stage including a conveyor arranged to convey the pasty composition in a conveying direction downstream from an inlet of the conveyor receiving the pasty composition from the mixer, a spray nozzle downstream of the conveyor inlet, the conveyor conveying the pasty composition in a conveying path from the inlet to the spray nozzle, and a support arranged in the conveying path upstream of the inlet and defining an opening for receiving the spray nozzle whereby the nozzle may be inserted in the opening for positioning in the inlet and the conveying path forms a closed circuit;

further comprising a drive for the conveyor, and a probe sensing the inserted position of the spray nozzle in the support opening and controlling the conveyor drive; and whereby whenever said spray nozzle is inserted into said support opening, said probe is displaced generating a contact signal, which causes said mixer to stop.

3. The apparatus of claim 2, further comprising a timer control for the conveyor drive, the probe being arranged to operate the timer control.

4. The apparatus of claim 2, further comprising a lance supporting the spray nozzle, the opening being arranged to hold the lance and the probe including a contact switch on the support, the contact switch being energized when the spray nozzle lance is held in the opening.

5. An apparatus for intermittently spraying a setting pasty composition in successive spraying cycles, which comprises a preparation stage including a mixer for mixing a particulate solid material and a tempering liquid to prepare the pasty composition, and a delivery stage including a conveyor arranged to convey the pasty composition in a conveying direction downstream from an inlet of the conveyor receiving the pasty composition from the mixer, a spray nozzle downstream of the conveyor inlet, the conveyor conveying the pasty composition in a conveying path from the inlet to the spray nozzle, and a support arranged in the conveying path upstream of the inlet and defining an opening for receiving the spray nozzle whereby the nozzle may be inserted in the opening for positioning in the inlet and the conveying path forms a closed circuit;

further comprising a drive for the conveyor, and a probe sensing the inserted position of the spray nozzle in the support opening and controlling the conveyor drive;

whereby whenever said spray nozzle is inserted into said support opening, said probe is displaced generating a contact signal, which causes said mixer to stop and said tempering liquid to be interrupted; and whenever said spray nozzle is removed from said support opening, said probe returns to a resting position canceling the contact signal, which causes the mixer to operate again and said tempering liquid to be turned on.

* * * * *